(12) United States Patent
Xie et al.

(10) Patent No.: US 9,687,755 B2
(45) Date of Patent: Jun. 27, 2017

(54) EXTRACTION TOWER

(71) Applicant: Beijing Zehua Chemical Engineering Co. Ltd., Beijing (CN)

(72) Inventors: Runxing Xie, Beijing (CN); Bin He, Beijing (CN); Hongping Tang, Beijing (CN); Weiyang Fei, Beijing (CN)

(73) Assignee: Beijing Zehua Chemical Engineering Co., Ltd., Beijing (CN)

( * ) Notice: Subject to any disclaimer, the term of this patent is extended or adjusted under 35 U.S.C. 154(b) by 0 days.

(21) Appl. No.: 14/402,569

(22) PCT Filed: May 31, 2013

(86) PCT No.: PCT/CN2013/076537
§ 371 (c)(1),
(2) Date: Nov. 20, 2014

(87) PCT Pub. No.: WO2013/178086
PCT Pub. Date: Dec. 5, 2013

(65) Prior Publication Data
US 2015/0151217 A1    Jun. 4, 2015

(30) Foreign Application Priority Data
May 31, 2012    (CN) .......................... 2012 1 0177128

(51) Int. Cl.
*B01D 11/04* (2006.01)
*B01D 11/00* (2006.01)
*B01J 19/32* (2006.01)

(52) U.S. Cl.
CPC ............ *B01D 11/04* (2013.01); *B01D 11/043* (2013.01); *B01J 19/32* (2013.01)

(58) Field of Classification Search
CPC ............ C07C 7/04; B01D 3/14; B01D 11/04; G21C 1/28
(Continued)

(56) References Cited

U.S. PATENT DOCUMENTS

2011/0226607 A1* 9/2011 Anderson ................ B01D 3/32
203/84

FOREIGN PATENT DOCUMENTS

CN    1471990 A    2/2004
CN    1935815 A    3/2007
(Continued)

OTHER PUBLICATIONS

International Search Report corresponding to PCT/CN2013/076537 (4 pages).

*Primary Examiner* — Monzer R Chorbaji
(74) *Attorney, Agent, or Firm* — Maginot, Moore & Beck, LLP (57) ABSTRACT

An extraction tower includes a housing defining a light phase outlet at a top thereof, a heavy phase inlet at an upper portion thereof, a light phase inlet at a lower portion thereof and a heavy phase outlet at a bottom thereof; a heavy phase distributor disposed in the housing and communicated with the heavy phase inlet; a light phase distributor disposed in the housing and communicated with the light phase inlet; a packing layer disposed in the housing and located between the heavy phase distributor and the light phase distributor; and at least one layer of vertical plates disposed in at least one of the packing layers, each layer of the vertical plates comprising at least two vertical plates parallel or cross to each other, each vertical plate disposed in an axial direction.

20 Claims, 3 Drawing Sheets

(58) Field of Classification Search
USPC ........ 68/726; 494/16; 585/805, 828; 203/84;
422/548, 187, 261; 202/170
See application file for complete search history.

(56) References Cited

FOREIGN PATENT DOCUMENTS

| | | | |
|---|---|---|---|
| CN | 102698465 | A | 10/2012 |
| CN | 202590429 | U | 12/2012 |
| WO | 2013178086 | A1 | 12/2013 |

\* cited by examiner

EXTRACTION TOWER

CROSS REFERENCE TO RELATED APPLICATIONS

This U.S. application claims priority under 35 U.S.C. 371 to, and is a U.S. National Phase application of, the International Patent Application No. PCT/CN2013/076537, filed May 31, 2013, which claims the benefit of prior Chinese Application No. 201210177128.6 filed May 31, 2012. The entire contents of the above-mentioned patent applications are incorporated by reference as part of the disclosure of this U.S. application.

FIELD

Embodiments of the present disclosure generally relate to a field of chemical production equipment, more particularly, to an extraction tower.

BACKGROUND ART

Figure 1:
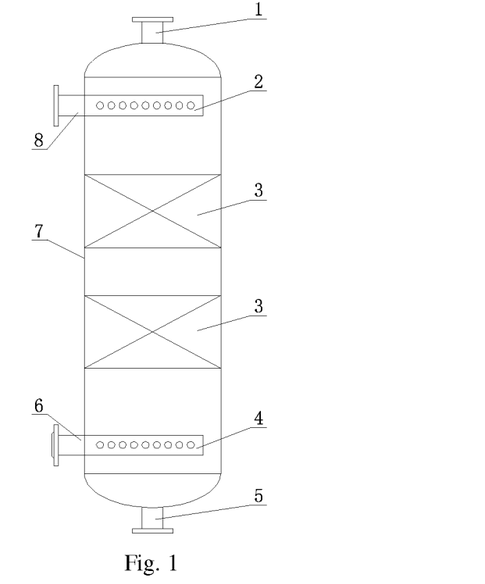
FIG. 1 is a schematic view of an extraction tower in the related art.

A liquid-liquid extraction is one of significant methods of chemical separation, and performs purifications or separations of each component by using different distribution rates between two solvents immiscible to each other or between two solvents partly miscible. An extraction tower is one of the key devices of extraction process and the main advantage thereof is adapted to implement a large scale continuous production. Within the extraction tower, under an action of gravity, a dispersed phase in manner of liquid droplet group counter-current-wise contacts with a continuous phase due to a density difference, so as to implement a mass transfer. As shown in FIG. 1, a typical extraction tower in the related art is provided.

For the extraction tower, especially for the execration tower without external power, a packing is very important, because the packing can prevent the continuous phase from axially back-mixing and facilitates crushing, gathering and re-dispersing of the dispersed phase by providing a surface area to improve the effects of the mass transfer. Thus, current studies and researches of the extraction tower are mostly focused on the structure improvements of the packing which can facilitate a smooth flowing of the continuous phase and the gathering and dispersing of the dispersed phase.

However, in the conditions of a small density difference between the two phases and a high viscosity of the continuous phase, the axial back-mixing of the extraction tower in the related art is very serious, especially the axial back-mixing of the continuous phase, so that a production capacity and a separation efficiency of the extraction tower are greatly reduced.

SUMMARY

Embodiments of the present disclosure seek to solve at least one of the problems existing in the related art to at least some extent, and provides an extraction tower with a redistributor and/or a vertical plate which change an inner structure of the extraction tower to improve a flow state of a liquid phase and a separation efficiency of the extraction tower.

According to embodiments of a first broad aspect of the present disclosure, an extraction tower is provided. The extraction tower includes a housing defining a light phase outlet at a top thereof, a heavy phase inlet at an upper portion thereof, a light phase inlet at a lower portion thereof and a heavy phase outlet at a bottom thereof; a heavy phase distributor disposed in the housing and communicated with the heavy phase inlet; a light phase distributor disposed in the housing and communicated with the light phase inlet; a packing layer disposed in the housing and located between the heavy phase distributor and the light phase distributor; and at least one layer of vertical plates disposed in at least one of the packing layers, each layer of the vertical plates comprising at least two vertical plates parallel or cross to each other, each vertical plate disposed in an axial direction.

According to embodiments of a second broad aspect of the present disclosure, an extraction tower is provided. The extraction tower includes: a housing defining a light phase outlet at a top thereof, a heavy phase inlet at an upper portion thereof, a light phase inlet at a lower portion thereof and a heavy phase outlet at a bottom thereof; a heavy phase distributor disposed in the housing and communicated with the heavy phase inlet; a light phase distributor disposed in the housing and communicated with the light phase inlet; a packing layer disposed in the housing and located between the heavy phase distributor and the light phase distributor; and at least one redistributor disposed at at least one of a position between the packing layer and the light phase distributor and a position between the packing layer and the heavy phase distributor.

In some embodiments, a plurality of the packing layers are provided, the at least one redistributor is located at at least one of a position between adjacent ones of the packing layers, the position between the packing layer and the light phase distributor and the position between the packing layer and the heavy phase distributor.

According to embodiments of a third broad aspect of the present disclosure, an extraction tower is provided. The extraction tower includes: a housing defining a light phase outlet at a top thereof, a heavy phase inlet at an upper portion thereof, a light phase inlet at a lower portion thereof and a heavy phase outlet at a bottom thereof; a heavy phase distributor disposed in the housing and communicated with the heavy phase inlet; a light phase distributor disposed in the housing and communicated with the light phase inlet; a packing layer disposed in the housing and located between the heavy phase distributor and the light phase distributor; at least one layer of vertical plates disposed in at least one of the packing layers, each layer of the vertical plates comprising at least two vertical plates parallel or cross to each other, each vertical plate disposed in an axial direction; and at least one redistributor disposed at at least one of a position between the packing layer and the light phase distributor and a position between the packing layer and the heavy phase distributor.

In some embodiments, a plurality of the packing layers are provided, the at least one redistributor is located at at least one of a position between adjacent ones of the packing layers, the position between the packing layer and the light phase distributor and the position between the packing layer and the heavy phase distributor.

In some embodiments, the redistributor comprises at least one first trough and a plurality of second troughs, the at least first trough is straddled over tops of the second troughs, a plurality of first distributing holes are formed in a top of the first trough and a plurality of second distributing holes are formed in the top of each second trough and communicated with the first distributing holes, so that the first trough is communicated with each second trough.

In some embodiments, the redistributor comprises at least one first trough and a plurality of second troughs, the at least first trough is straddled over tops of the second troughs, a plurality of first distributing holes are formed in a top of the first trough and a plurality of second distributing holes are formed in the top of each second trough and communicated with the first distributing holes, so that the first trough is communicated with each second trough, a baffle plate is directly connected between bottoms of adjacent ones of the second troughs and between the outmost second troughs and the housing, a plurality of third distributing holes are formed in the baffle plate.

In some embodiments, third troughs are disposed between bottoms of adjacent ones of the second troughs and between the outmost second troughs and the housing, the third troughs are directly connected with the bottoms of the second troughs and the housing, a gap is formed between the third trough and the bottom of the second trough.

In some embodiments, third troughs are disposed between bottoms of adjacent ones of the second troughs and between the outmost second troughs and the housing, the third troughs are directly connected with the bottoms of the second troughs and the housing, a fourth distributing hole is formed in each third trough.

In some embodiments, third troughs are disposed between bottoms of adjacent ones of the second troughs and between the outmost second troughs and the housing, the third trough is connected with the bottom of the second trough via a first connection plate.

In some embodiments, the redistributor comprises a distributing plate and at least one downcomer, each downcomer defines a top end and a bottom end and penetrates the distributing plate, and a plurality of fifth distributing holes are formed in the distributing plate.

In some embodiments, a fourth trough is directly connected with the bottom end of each downcomer, and a gap is formed between the bottom end of the downcomer and the fourth trough.

In some embodiments, a fourth trough is directly connected with the bottom end of each downcomer, and a sixth distributing hole is formed in the fourth trough.

In some embodiments, a fourth trough is connected with the bottom end of each downcomer via a second connection plate.

The extraction tower with the redistributor and/or the vertical plate according to embodiments of the present disclosure has the following advantages:

With arrangements of the redistributors and the vertical plates, the inner structure of the extraction tower is changed. Especially, the redistributors can eliminate an axial back-mixing of the continuous phase, and the vertical plates can eliminate a radial flow of the continuous phase, so that the flow state of the liquid phase can be improved, i.e. a flow state of the continuous phase within the extraction tower is converted into a substantial plug flow. Thus, the separation efficiency and production capability of the extraction tower are increased, and the structure of the extraction tower can be simplified. Moreover, the extraction tower of the present disclosure provides a new method which overcomes a prejudice that the efficiency improvement of the extraction tower merely depends on the structure changes of the packing.

BRIEF DESCRIPTION OF THE DRAWINGS

These and other aspects and advantages of embodiments of the present disclosure will become apparent and more readily appreciated from the following descriptions made with reference the accompanying drawings, in which.

Reference numbers include:

1: light phase outlet; 2: heavy phase distributor; 3: packing layer; 4: light phase distributor; 5: heavy phase outlet; 6: light phase inlet; 7: housing; 8: heavy phase inlet; 9: vertical plate; 10: redistributor; 11: first trough; 12: second trough; 13: second distributing hole; 14: baffle plate; 15: first distributing hole; 16: third trough; 17: fourth distributing hole; 18: first connection plate; 19: distributing plate; 20: downcomer; 21: fifth distributing hole; 22: fourth trough; 23 sixth distributing hole; 24: second connection plate; 25: third distributing hole.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the specification, Unless specified or limited otherwise, relative terms such as "central", "longitudinal", "lateral", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

Terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also, it is to be understood that phraseology and terminology used herein with reference to device or element orientation (such as, for example, terms like "central," "upper," "lower," "front," "rear," and the like) are only used to simplify description of the present disclosure, and do not alone indicate or imply that the device or element referred to must have a particular orientation.

In addition, terms such as "first" and "second" are used herein for purposes of description and are not intended to indicate or imply relative importance or significance.

An extraction tower according to embodiments of the present disclosure will be described referring to FIGS. 1-10.

Figure 2:
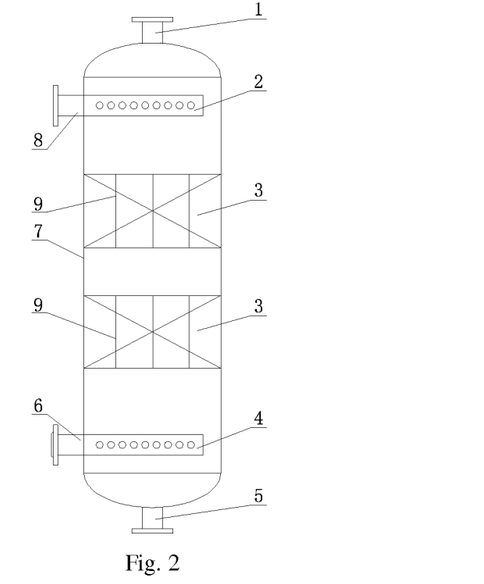
FIG. 2 is a schematic view of an extraction tower with vertical plates according to embodiments of the present disclosure.

As shown in FIG. 2, in some embodiments, the extraction tower includes a housing 7, a heavy phase distributor 2, a packing layer 3, a light phase distributor 4 and at least one layer of vertical plates 9.

Figure 3:
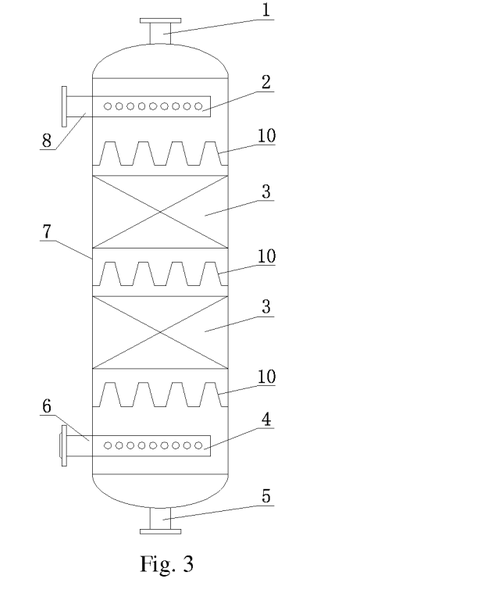
FIG. 3 is a schematic view of an extraction tower with redistributors according to embodiments of the present disclosure.
Figure 4:
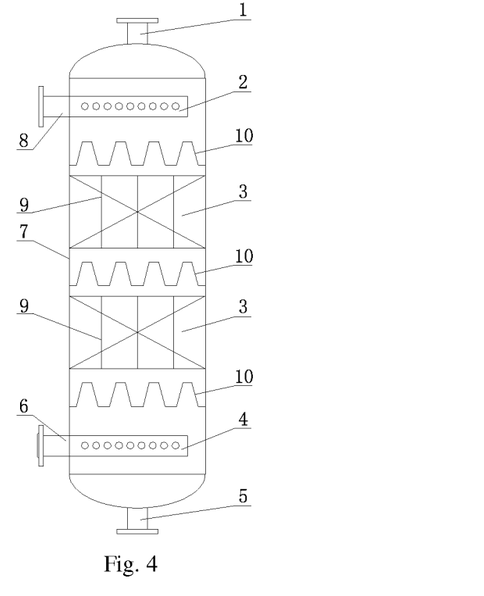
FIG. 4 is a schematic view of an extraction tower with vertical plates and the redistributors according to embodiments of the present disclosure.

The housing 7 has a light phase outlet 1 formed at a top thereof, a heavy phase inlet 8 formed at an upper portion thereof, a light phase inlet 6 formed at a lower portion thereof and a heavy phase outlet 5 formed at a bottom thereof. The heavy phase distributor 2, one or more packing layers 3 and the light phase distributor 4 are arranged within the housing 8 from the top to the bottom in an axial direction, i.e. the up-down direction as shown in FIGS. 2-4. The heavy phase distributor 2 is communicated with the heavy phase inlet 8, and the light phase distributor 4 is communicated with the light phase inlet 6. At least one layer of vertical plates 9 is disposed in at least one of the packing layers 3, each layer of the vertical plates 9 includes one vertical plate 9 or at least two vertical plates 9 parallel or cross to each other, and each vertical plate 9 is disposed in the axial direction, i.e. each vertical plate 9 is extended in the axial direction.

As shown in FIG. 3, in some embodiments, the extraction tower includes a housing 7, a heavy phase distributor 2, a packing layer 3, a light phase distributor 4 and a redistributor 10.

The housing 7 has a light phase outlet 1 formed at a top thereof, a heavy phase inlet 8 formed at an upper portion thereof, a light phase inlet 6 formed at a lower portion thereof and a heavy phase outlet 5 formed at a bottom thereof. The heavy phase distributor 2, one or more packing layers 3 and the light phase distributor 4 are arranged within the housing 8 from the top to the bottom in an axial direction. The heavy phase distributor 2 is communicated with the heavy phase inlet 8, and the light phase distributor 4 is communicated with the light phase inlet 6. The redistributor 10 is disposed between the packing layer 3 and the light phase distributor 4 and/or between the packing layer 3 and the heavy phase distributor 2.

When a plurality of the packing layers 3 are provided, the redistributor 10 may be disposed in at least one of a position between adjacent packing layers 3, a position between the packing layer 3 and the light phase distributor 4 and a position between the packing layer 3 and the heavy phase distributor 2.

As shown in FIG. 4, in some embodiments, the extraction tower includes a housing 7, a heavy phase distributor 2, a packing layer 3, at least one layer of vertical plates 9, a light phase distributor 4 and a redistributor 10.

Figure 5:
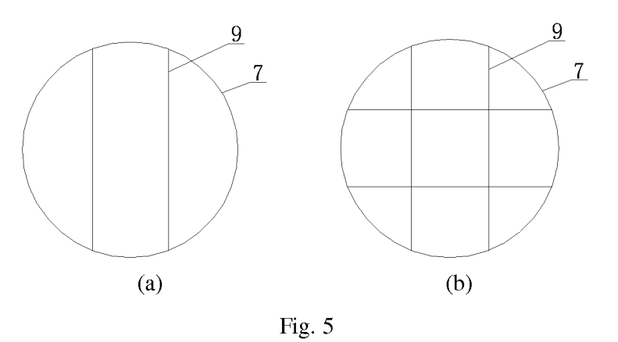
FIG. 5 is a schematic view of vertical plates of an extraction tower according to embodiments of the present disclosure, in which FIG. 5 (a) shows the vertical plates parallel to each other, and FIG. 5 (b) shows the vertical plates cross to each other.

The housing 7 has a light phase outlet 1 formed at a top thereof, a heavy phase inlet 8 formed at an upper portion thereof, a light phase inlet 6 formed at a lower portion thereof and a heavy phase outlet 5 formed at a bottom thereof. The heavy phase distributor 2, one or more packing layers 3 and the light phase distributor 4 are arranged within the housing 8 from the top to the bottom in an axial direction. The heavy phase distributor 2 is communicated with the heavy phase inlet 8, and the light phase distributor 4 is communicated with the light phase inlet 6. At least one layer of vertical plates 9 is disposed in at least one of the packing layers 3, each layer of the vertical plates 9 includes one vertical plate 9 or at least two vertical plates 9 parallel (as shown in FIG. 5 (*a*)) or cross (as shown in FIG. 5 (*b*)) to each other, and each vertical plate 9 is disposed in the axial direction, i.e. each vertical plate 9 is extended in the axial direction. The redistributor 10 is disposed between the packing layer 3 and the light phase distributor 4 and/or between the packing layer 3 and the heavy phase distributor 2.

When a plurality of the packing layers 3 are provided, the redistributor 10 may be disposed in at least one of a position between adjacent packing layers 3, a position between the packing layer 3 and the light phase distributor 4 and a position between the packing layer 3 and the heavy phase distributor 2.

Figure 6:
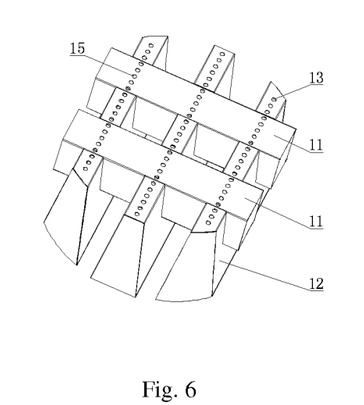
FIG. 6 is a schematic view of a redistributor of an extraction tower according to a first embodiment of the present disclosure.

As shown in FIG. 6, in some embodiments, the redistributor 10 includes at least one first trough 11 and a plurality of second troughs 12, the at least one first trough 11 is straddled over tops of the second troughs, a plurality of first distributing holes 15 are formed in a top of the first trough 11 and a plurality of second distributing holes 13 are formed in the top of each of the second troughs 12 and communicated with the first distributing holes 15, so that the first trough 11 is communicated with each of the second troughs 12. A cross-section of each second trough 12 may be configured as a trapezoid or a rectangle.

Figure 7:
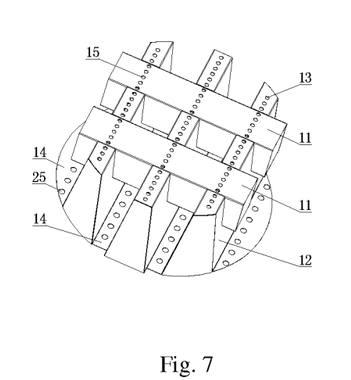
FIG. 7 is a schematic view of a redistributor of an extraction tower according to a second embodiment of the present disclosure.

As shown in FIG. 7, in some embodiments, the redistributor 10 includes at least one first trough 11 and a plurality of second troughs 12, the at least one first trough 11 is straddled over tops of the second troughs 12, a plurality of first distributing holes 15 are formed in a top of the first trough 11 and a plurality of second distributing holes 13 are formed in the top of each second trough 12 and communicated with the first distributing holes 15, so that the first trough 11 is communicated with each second trough 12. A cross-section of each second trough 12 may be configured as a trapezoid or a rectangle. A baffle plate 14 is directly connected between bottoms of adjacent ones of the second troughs 12 and between the outmost second troughs 12 and the housing 7, a plurality of third distributing holes 25 are formed in the baffle plate 14.

Figure 8:
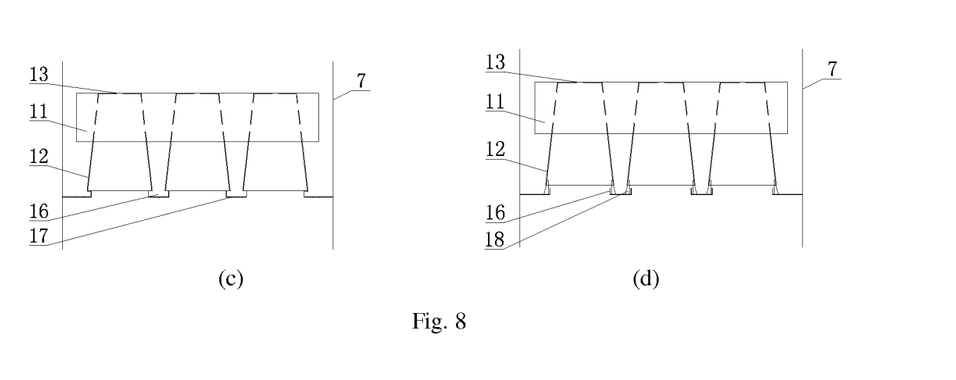
FIG. 8 is a schematic view of a redistributor of an extraction tower according to a third embodiment of the present disclosure, in FIG. 8(c) a housing, bottoms of second troughs and third troughs are connected directly, in FIG. 8 (d) the third troughs and the bottoms of the second troughs are connected via first connection plates.

As shown in FIG. 8, in some embodiments, the redistributor 10 includes at least one first trough 11 and a plurality of second troughs 12, the at least one first trough 11 is straddled over tops of the second troughs 12, a plurality of first distributing holes 15 are formed in a top of the first trough 11 and a plurality of second distributing holes 13 are formed in the top of each second trough 12 and communicated with the first distributing holes 15, so that the first trough 11 is communicated with each second trough 12. A cross-section of each second trough 12 may be configured as a trapezoid or a rectangle. A plurality of third troughs 16 are disposed between bottoms of adjacent ones of the second troughs 12 and between the outmost second troughs 12 and the housing 7, the third troughs 16 are directly connected with the bottoms of the second troughs 12 and the housing 7. A gap is formed between each third trough 16 and the bottom of each second trough 12, or a fourth distributing hole 17 is formed in each third trough 16, as shown in FIG. 8 (c). Thus, the liquid phase can pass through the gaps or the fourth distributing holes 17.

As shown in FIG. 8 (d), the third trough 16 may be connected with the bottom of each second trough 12 via a first connection plate 18, instead of forming a direct connection between the third troughs 16 and the bottoms of the second troughs 12. Thus, the liquid phase can pass through the indirect connections.

Figure 9:
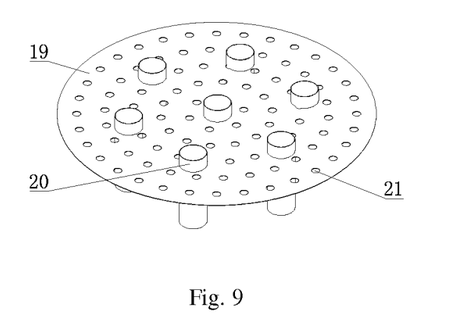
FIG. 9 is a schematic view of a redistributor of an extraction tower according to a fourth embodiment of the present disclosure.

As shown in FIG. 9, the redistributor 10 includes a distributing plate 19 and at least one downcomer 20, each downcomer 20 has a top end and a bottom end and penetrates the distributing plate 19, and a plurality of fifth distributing holes 21 are formed in the distributing plate 19. A cross-section of the downcomer 20 is not limited, and may be configured as any shape.

Figure 10:
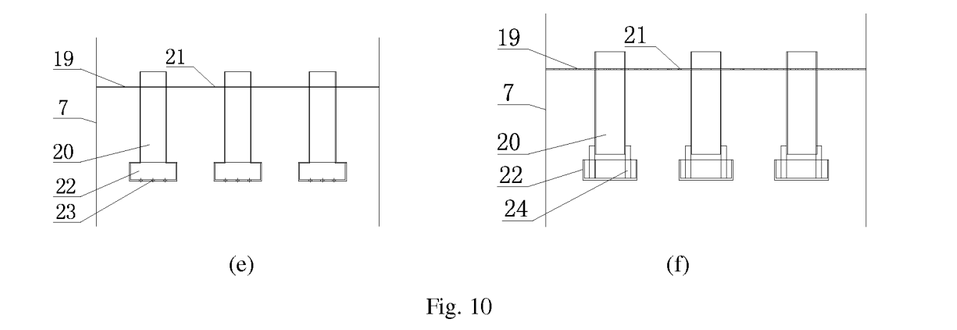
FIG. 10 is a schematic view of a redistributor of an extraction tower according to a fifth embodiment of the present disclosure, in FIG. 10 (e) fourth troughs and bottoms of downcomers are connected directly, in FIG. 10 (f) the fourth troughs and the bottoms of the downcomers are connected via second connection plates.

As shown in FIG. 10, a fourth trough 22 is directly connected with the bottom end of each downcomer 20, and a gap is formed between the bottom end of each downcomer 20 and each fourth trough 22, or a sixth distributing hole 23 is formed in the fourth trough 20, as shown in FIG. 10 (e). Thus, the liquid phase can pass through the gaps or the sixth distributing holes 23.

The fourth trough 22 may be connected with the bottom end of each downcomer 20 via a second connection plate 24, as shown in FIG. 10 (f), instead of forming direct connections between the fourth trough 22 and the bottom of the downcomer 20. Thus, the liquid phase can pass through the indirect connections.

In some embodiments, the extraction tower with the redistributor 10 and/or the vertical plate 9 according to embodiments of the present disclosure is configured as a vertical extraction tower, and a diameter of the extraction tower ranges from 100 mm to 20,000 mm. The packing layers 3 may further be disposed between the heavy phase distributor 2 and the light phase outlet 1 and between the light phase distributor 4 and the heavy phase outlet 5 to separate the liquid phases, and the packing layers 3 may have the vertical plates 9 disposed therein.

A thickness of each packing layer 3 ranges from 0.05 m to 50 m, specifically ranges from 0.1 m to 20 m, preferably ranges from 0.2 m to 10 m.

A diameter of the third distributing holes 25 in the baffle plate 14 ranges from 1 mm to 200 mm, preferably ranges from 1 mm to 100 mm, more preferably ranges from 3 mm to 50 mm.

Diameters of the first and second distributing holes 15, 13 may range from 1 mm to 100 mm, specifically range from 1 mm to 50 mm, preferably range from 2 mm to 30 mm.

The redistributors 10 may keep working within the extraction tower in a manner of inversion.

A brief working principle of the extraction tower of the present disclosure will be described, and the extraction tower as shown in FIG. 4 will be taken as an example.

During a separation process of the extraction tower, the heavy phase with higher density as the continuous phase is filled into the extraction tower via the heavy phase inlet 8, and is evenly distributed in a cross-section of the extraction tower after passing through the heavy phase distributor 2, then flows downwardly under an action of gravity. Meanwhile, the light phase as the dispersed phase is filled into the extraction tower via the light phase inlet 6 and is converted into a group of small liquid droplets to form the dispersed phase after passing through the light phase distributor 4, then the group of small liquid droplets flows upwardly to contact with the heavy phase counter-current-wise due to a density difference between the light and heavy phases, so as to implement a mass transfer.

Within the packing layer 3, the packing can partly prevent the continuous phase from axially back-mixing, and facilitates the crushing, gathering and re-dispersing of the dispersed phase by providing a surface area to ensure a sufficient contact between the dispersed phase materials and continuous phase materials. The vertical plates 9 can eliminate a flow of the continuous phase in a radial direction (i.e. the left-right direction as shown in FIGS. 2-4), so that a flow state of the liquid phase can be improved, i.e. a flow state of the continuous phase within the extraction tower is converted into a substantial plug flow.

When the light phase passes through the redistributor 10, as shown in FIG. 6, the light phase flows upwardly and gathers below the redistributor 10, then passes through the second distributing holes 13 of the second trough 12 and the first distributing holes 15 of the first trough 11 to be re-distributed and re-formed into the group of small liquid droplets. The axial back-mix of the light phase can be dramatically reduced after redistribution of the redistributor 10. The heavy phase flows into a next packing layer 3 via the gaps between the bottoms of the second troughs 12 and between the outmost second troughs 12 and the housing 7.

When the heavy phase passes through the redistributor 10, as shown in FIG. 7, the heavy phase gathers above the redistributor 10 and passes through the third distributing holes 25 of the baffle plate 14, so that the heavy phase is redistributed and flows downwardly. When the plurality of third troughs 16 are disposed between bottoms of adjacent ones of the second troughs 12 and between the outmost second troughs 12 and the housing 7, as shown in FIG. 8 (c), the heavy phase gathers above the redistributor 10 and passes through the gaps between third trough 16 and the second trough 12 or the fourth distributing holes 17 of third trough 16, so that the heavy phase is redistributed and flows downwardly. The axial back-mix of the heavy phase can be effectively eliminated after the redistribution of the redistributor 10.

When the structure of the redistributor 10 is configured as shown in FIG. 9, the light phase flows upwardly and gathers below the distributing plate 19, and passes through the fifth distributing holes 21 to be redistributed. The heavy phase gathers above the distributing plate 19, and passes through the downcomer 20 and flows downwardly. When the fourth trough 22 is connected with the bottom end of each downcomer 20, as shown in FIG. 10 (e), the heavy phase passes through the gaps between the bottom end of each downcomer 20 and each fourth trough 22 or the sixth distributing hole 23 formed in the fourth trough 20, so that the heavy phase is redistributed.

Finally, the light phase is collected via the light phase outlet 1 from a top of the extraction tower, and the heavy phase is collected via the heavy phase outlet 5 from a bottom of the extraction tower, such that the extraction and separation are completed.

When the heavy phase is used as the dispersed phase and the light phase is used as continuous phase, the redistributors 10 can work within the extraction tower in a manner of inversion, and concerning the rest working principle of the extraction tower, reference is made to the above mentioned descriptions.

Reference throughout this specification to "an embodiment," "some embodiments," "one embodiment", "another example," "an example," "a specific examples," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example, "in an example," "in a specific examples," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments can not be construed to limit the present disclosure, and changes, alternatives, and modifications can be made in the embodiments without departing from spirit, principles and scope of the present disclosure.

What is claimed is:

1. An extraction tower, comprising:
a housing defining a light phase outlet at a top thereof, a heavy phase inlet at an upper portion thereof, a light phase inlet at a lower portion thereof and a heavy phase outlet at a bottom thereof;
a heavy phase distributor disposed in the housing and communicated with the heavy phase inlet;
a light phase distributor disposed in the housing and communicated with the light phase inlet;
a packing layer disposed in the housing and located between the heavy phase distributor and the light phase distributor; and
at least one layer of vertical plates disposed in at least one of the packing layers, each layer of the vertical plates comprising at least two vertical plates parallel or cross to each other, each vertical plate disposed in an axial direction,
wherein the heavy phase inlet is configured to supply a heavy phase having a relatively larger density, and the light phase inlet is configured to supply a light phase having a relatively smaller density so that the extraction tower is operable for liquid-liquid mass transfer, and
further wherein the light phase outlet is configured to output the light phase having the relatively smaller density and the heavy phase outlet is configured to output the heavy phase having the relatively larger density.

2. An extraction tower, comprising:
a housing defining a light phase outlet at a top thereof, a heavy phase inlet at an upper portion thereof, a light phase inlet at a lower portion thereof and a heavy phase outlet at a bottom thereof;
a heavy phase distributor disposed in the housing and communicated with the heavy phase inlet;
a light phase distributor disposed in the housing and communicated with the light phase inlet;
a packing layer disposed in the housing and located between the heavy phase distributor and the light phase distributor; and
at least one redistributor disposed at at least one of a position between the packing layer and the light phase distributor and a position between the packing layer and the heavy phase distributor,
wherein the heavy phase inlet is configured to supply a heavy phase having a relatively larger density, and the light phase inlet is configured to supply a light phase having a relatively smaller density so that the extraction tower is operable for liquid-liquid mass transfer,
wherein the light phase outlet is configured to output the light phase having the relatively smaller density and the heavy phase outlet is configured to output the heavy phase having the relatively larger density, and
further wherein the redistributor is configured to redistribute at least one of the light phase and the heavy phase.

3. The extraction tower according to claim 2, wherein a plurality of the packing layers are provided, the at least one redistributor is located at at least one of a position between adjacent ones of the packing layers, the position between the packing layer and the light phase distributor and the position between the packing layer and the heavy phase distributor.

4. The extraction tower according to claim 2, wherein the redistributor comprises at least one first trough and a plurality of second troughs, the at least one first trough is straddled over tops of the second troughs, so that the first trough is communicated with each second trough, a plurality of first distributing holes are formed in a top of the first trough and a plurality of second distributing holes are formed in the top of each second trough.

5. The extraction tower according to claim 2, wherein the redistributor comprises at least one first trough and a plurality of second troughs, the at least one first trough is straddled over tops of the second troughs, so that the first trough is communicated with each second trough, a plurality of first distributing holes are formed in a top of the first trough and a plurality of second distributing holes are formed in the top of each second trough, a baffle plate is directly connected between bottoms of adjacent ones of the second troughs and between the outmost second troughs and the shell body, a plurality of third distributing holes are formed in the baffle plate.

6. The extraction tower according to claim 2, wherein the redistributor comprises a distributing plate and at least one downcomer, each downcomer defines a top end and a bottom end, the top end of each downcomer penetrates the distributing plate, and a plurality of fifth distributing holes are formed in the distributing plate.

7. The extraction tower according to claim 6, wherein a fourth trough is directly connected with the bottom end of each downcomer, and a gap is formed between the bottom end of the downcomer and the fourth trough.

8. The extraction tower according to claim 6, wherein a fourth trough is directly connected with the bottom end of each downcomer, and a sixth distributing hole is formed in the fourth trough.

9. The extraction tower according to claim 6, wherein a fourth trough is connected with the bottom end of each downcomer via a second connection plate.

10. An extraction tower, comprising:
a housing defining a light phase outlet at a top thereof, a heavy phase inlet at an upper portion thereof, a light phase inlet at a lower portion thereof and a heavy phase outlet at a bottom thereof;
a heavy phase distributor disposed in the housing and communicated with the heavy phase inlet;
a light phase distributor disposed in the housing and communicated with the light phase inlet;
a packing layer disposed in the housing and located between the heavy phase distributor and the light phase distributor;
at least one layer of vertical plates disposed in at least one of the packing layers, each layer of the vertical plates comprising at least two vertical plates parallel or cross to each other, each vertical plate disposed in an axial direction; and
at least one redistributor disposed at at least one of a position between the packing layer and the light phase distributor and a position between the packing layer and the heavy phase distributor,
wherein the heavy phase inlet is configured to supply a heavy phase having a relatively larger density, and the light phase inlet is configured to supply a light phase having a relatively smaller density so that the extraction tower is operable for liquid-liquid mass transfer,
wherein the light phase outlet is configured to output the light phase having the relatively smaller density and the heavy phase outlet is configured to output the heavy phase having the relatively larger density, and
further wherein the redistributor is configured to redistribute at least one of the light phase and the heavy phase.

11. The extraction tower according to claim 10, wherein a plurality of the packing layers are provided, the at least one redistributor is located at at least one of a position between adjacent ones of the packing layers, the position between the packing layer and the light phase distributor and the position between the packing layer and the heavy phase distributor.

12. The extraction tower according to claim 10, wherein the redistributor comprises at least one first trough and a plurality of second troughs, the at least first trough is straddled over tops of the second troughs, a plurality of first distributing holes are formed in a top of the first trough and a plurality of second distributing holes are formed in the top of each second trough and communicated with the first distributing holes, so that the first trough is communicated with each second trough.

13. The extraction tower according to claim 12, wherein third troughs are disposed between bottoms of adjacent ones of the second troughs and between the outmost second troughs and the housing, the third troughs are directly connected with the bottoms of the second troughs and the housing, a gap is formed between the third trough and the bottom of the second trough.

14. The extraction tower according to claim 12, wherein third troughs are disposed between bottoms of adjacent ones of the second troughs and between the outmost second troughs and the housing, the third troughs are directly connected with the bottoms of the second troughs and the housing, a fourth distributing hole is formed in each third trough.

15. The extraction tower according to claim 12, wherein third troughs are disposed between bottoms of adjacent ones of the second troughs and between the outmost second troughs and the housing, the third trough is connected with the bottom of the second trough via a first connection plate.

16. The extraction tower according to claim 10, wherein the redistributor comprises at least one first trough and a plurality of second troughs, the at least first trough is straddled over tops of the second troughs, a plurality of first distributing holes are formed in a top of the first trough and a plurality of second distributing holes are formed in the top of each second trough and communicated with the first distributing holes, so that the first trough is communicated with each second trough, a baffle plate is directly connected between bottoms of adjacent ones of the second troughs and between the outmost second troughs and the housing, a plurality of third distributing holes are formed in the baffle plate.

17. The extraction tower according to claims 10, wherein the redistributor comprises a distributing plate and at least one downcomer, each downcomer defines a top end and a bottom end and penetrates the distributing plate, and a plurality of fifth distributing holes are formed in the distributing plate.

18. The extraction tower according to claim 17, wherein a fourth trough is directly connected with the bottom end of each downcomer, and a gap is formed between the bottom end of the downcomer and the fourth trough.

19. The extraction tower according to claim 17, wherein a fourth trough is directly connected with the bottom end of each downcomer, and a sixth distributing hole is formed in the fourth trough.

20. The extraction tower according to claim 17, wherein a fourth trough is connected with the bottom end of each downcomer via a second connection plate.

* * * * *